United States Patent Office 3,129,181
Patented Apr. 14, 1964

3,129,181
PROCESS FOR PREPARING MATERIALS HAVING IMPROVED PHYSICAL FORM
Frederick J. Ihde, Jr., Mountain Lakes, N.J., assignor to Nopco Chemical Company, Harrison, N.J., a corporation of New Jersey
No Drawing. Filed Aug. 26, 1959, Ser. No. 836,086
27 Claims. (Cl. 252—49.7)

The present invention relates to an improved process for preparing siliceous amino compounds.

In copending application Serial No. 534,162, filed September 13, 1955, now Patent No. 2,967,828 issued January 10, 1961, of which this application is a continuation-in-part, there are disclosed siliceous amino compounds. These materials are prepared by reacting in aqueous medium partial amide salts with water soluble silicate salts in which said silicate salts are present in at least stoichiometric amounts. If the silicate salts are present in greater than stoichiometric amounts, then after reaction between the partial amide salt and silicate, the excess silicate salt can be converted to silicon dioxide by treatment with an acid and the siliceous amino compound is then adsorbed upon the surface of the silicon dioxide. This silicon dioxide is referred to as free or uncombined silica or colloidal silica. These materials are characterized by a unique and unexpected property, i.e., when added to an oil or other organic material the resulting mixture demonstrates an increased viscosity at elevated temperatures which surpasses the initial viscosity of the mixture at room temperature. Also, greases containing same will have lower penetration values at elevated temperatures. Of course, the greater the amount of silicon dioxide present in the composition, the less noticeable will be this property since the silicon dioxide will exert a masking or dilution effect. These siliceous amino compounds after drying and grinding are obtained as white, powdery materials, unctuous in texture and having a particle size less than 0.5 micron in diameter.

As will be discussed more fully hereinafter, it has been found that improved greases characterized by increased mechanical and thermal stability and increased oil bodying properties are obtained if they contain these siliceous amino compounds in which the quantity of siliceous amino compound is less than 25% calculated as percent partial amide based upon the total weight of siliceous amino compound plus silicon dioxide or if the number of amino groups or number of carbon atoms in the carbon chain of the fatty material is reduced in the partial amide portion of the siliceous amino compound. However, in the preparation in aqueous medium of a siliceous amino compound having a partial amide content less than 25% or if the aforesaid amino groups and carbon atoms are reduced, a number of difficulties were encountered. For instance, excessive filtration rates and increased aggregate formation and shrinkage during drying were encountered. The dried aggregates could not be readily reduced to a fine unctuous powder. The prior art, however, does disclose methods for obtaining fine silica by making use of azeotropic distillation with organic solvents or by washing out the water and replacing it with alcohol. However, such procedures are costly and time consuming.

Accordingly, it is an object of this invention to prepare siliceous amino compounds in an improved manner to obviate the difficulties heretofore encountered with regard to filtration and preparation of fine particulate material.

It is a further object to prepare in an improved manner siliceous amino compounds in which the amount of siliceous amino compound, calculated as partial amide, is less than 25% by weight of the total weight of siliceous amino compound plus silicon dioxide or the number of amino groups and carbon atoms in the chain of the fatty material are reduced in the partial amide portion of the siliceous amino compound.

A still further object is to prepare improved greases which contain said siliceous amino compounds.

Other objects will become apparent from the detailed description given hereinafter. It is intended, however, that the detailed description and specific examples do not limit the invention, but merely indicate preferred embodiments thereof since various changes and modifications within the scope of the invention will become apparent to those skilled in the art.

It has been unexpectedly discovered that the above and other objects can be successfully achieved in the following manner. The siliceous amino compound is prepared by reacting partial amide salt and a water soluble silicate salt and absorbing thereon at least about 20% by weight, based upon the weight of the final product, of a liquid which is at least substantially water-insoluble. That is, the organic liquid is water-insoluble or substantially water-insoluble. Since, as described subsequently, in some embodiments a volatile organic liquid is used which is removed from the final product, it is preferable to refer to the quantity of the organic liquid as being at least about 25% based upon the weight of the siliceous amino compound plus free silica, if present. The maximum quantity of organic liquid is not a critical limitation, i.e., this quantity is governed by economic factors. Once the amount of organic liquid has given the desired rapid filtration and minimum aggregate formation during drying, an excess of organic liquid over this amount is of no practical value. However, when non-volatile organic liquids are used, a useful maximum weight ratio of the organic liquid to siliceous amino compound plus free silicia, if present, is 2:1 (or 66.6% organic liquid based on the weight of the siliceous amino compound, organic liquid and the free silica if it is present). Alternatively, this quantity of organic liquid can be expressed as 200% by weight of the siliceous amino compound plus free silica, if present. Above this ratio, no additional benefits are achieved. When volatile organic liquids are used, which would be removed during the subsequent drying operation, a useful maximum weight ratio of organic liquid to siliceous amino compound plus free silica, if present, is 2:1 (or 66.6% volatile organic liquid based on the weight of siliceous amino compound, free silica, if present, and volatile organic liquid). On the other hand, if it is desired to obtain a separation into an aqueous and a solvent layer thereby eliminating filtrations during washing, the weight ratio of organic liquid to siliceous amino compound and free silica, if present, could be as high as 10:1 or more.

The addition of the organic liquid is preferably made so that it will be absorbed upon the siliceous amino compound at the moment it is formed thereby favorably influencing the formation of fine particles. It is also preferred that the pH of the material be adjusted to a value between about 6.5 and 9.5 when the siliceous amino compound is formed or after it is adsorbed upon the silicon dioxide. The purpose of the adjustment is to obtain maximum absorption on the final product by the organic liquid. As a result, the siliceous amino compounds, especially those containing less than about 25% by weight of partial amide, based upon the total weight of the product including silicon dioxide as well as those products in which there is a reduced number of amino groups and carbon atoms in the partial amide portion of the siliceous amino compound filtered rapidly from aqueous media, aggregated and shrunk less during drying and formed finer and softer particles. Furthermore, the presence of the organic liquid during the formation of the siliceous amino compound was found to maintain the liquid mixture which is a slurry in a fluid and easily mixable state by preventing formation of a heavy gel thereby favorably influencing fine particle formation of the siliceous amino compound whether or not uncombined silica is present. This absorption surprisingly does not interfere with the adsorption of the siliceous amino compound upon colloidal silica. In other words, the organic liquid does not merely coat the siliceous amino compound, but plays an important role in the particle formation. Moreover, it was discovered that these siliceous amino compounds were strong absorbents for the organic liquids, i.e., these siliceous amino compounds would even absorb up to five times their weight of some of these organic liquids from mixtures of water and organic liquid.

Also, the use of a mixture of water and the organic liquid decreased the tendency of the product to become contaminated by the water-soluble salts which are produced both when excess silicate salt is converted to silicon dioxide with acid and when the siliceous amino compound is formed. Since the contaminating salt dissolves in the aqueous portion of the reaction mixture and since the siliceous amino compound absorbs the organic liquid, the immiscibility of the two liquids greatly lessens the opportunity for the contaminating salt and the siliceous amino compound to come into contact. As a result, products produced in a system comprising a mixture of water and an organic liquid will be obtained almost completely free of extraneous water-soluble organic salts. Moreover, greases containing these products were found to be improved with regard to their mechanical and thermal stability as well as their bodying properties. Also, lesser amounts of the products prepared as taught herein were needed to prepare a soft grease of the same consistency as compared with the amounts heretofore required. For example, whereas 17% to 40% by weight of the compounds of said copending application Serial No. 534,162 were required to prepare a soft solid grease, only 12% to 15% by weight of the compounds prepared according to this new process (omitting the weight of the non-volatile organic liquid when present) were required to prepare greases of equal consistency.

As used throughout the present specification and the claims, the expression partial amide refers to reaction products containing at least one amide group and at least one primary, secondary or tertiary amine group. From these partial amides, salts are prepared which are subsequently reacted with the water soluble silicate salt. The partial amides are produced by the reaction of (1) an alkylene polyamine containing two or more amino groups, such as, diethylene triamine, triethylene tetramine, tetraethylene pentamine, hexaethylene heptamine, phenylene diamine, etc., and derivatives of said polyamines having alkyl, hydroxy, alkoxy, etc., groups substituted for a hydrogen of an amino group thereof such as 3-dimethyl amino propylamine and aminoethylethanolamine with (2) a compound selected from the group consisting of aliphatic monocarboxylic acylating substances having a carbon chain length of from about 6 to about 22 carbon atoms, naphthenic acids and tall oil. The aliphatic monocarboxylic acylating substances include aliphatic monocarboxylic acids, whether saturated or unsaturated, hydroxylated or halogenated having a carbon chain length of from about 6 to about 22 carbon atoms as well as esters and acyl halides of such aliphatic monocarboxylic acids. These acylating substances contain the radical RCO—, wherein R represents a carbon chain length of from 5 to about 21 carbon atoms and can be saturated, unsaturated, hydroxylated or halogenated as indicated above. Examples of useful acylating substances are aliphatic monocarboxylic acids such as caproic acid, caprylic acid, capric acid, lauric acid, myristic acid, palmitic acid, stearic acid, oleic acid, linoleic acid, linolenic acid, dichlorostearic acid and hydroxy stearic acid and mixtures thereof which are obtained from glycerides such as tallow fatty acids and hydrogenated tallow fatty acids; glycerides, such as tallow, soybean oil, coconut oil, cottonseed oil, palm kernel oil, castor oil and other fats and oils, either natural or hydrogenated and acyl halides such as n-caproyl chloride, octanoyl chloride, lauroyl chloride, stearyl chloride, etc. In the preferred embodiment of the invention, however, partial amides prepared by reacting an alkylene polyamine with an aliphatic monocarboxylic acid having a carbon chain length of from about 8 to about 18 carbon atoms are employed.

The partial amide can be prepared by heating together the polyamine and acylating material at temperatures of between about 150° to 200° C. until the theoretical amount of water has been removed and the acid value is reduced generally to less than 10. For instance, in the case of preparing a monoamide, equimolar quantities of an acylating material such as a fatty acid and polyamine are heated until one mol of water is removed. If a diamide is to be prepared, then two mols of acylating material such as a fatty acid and one mol of a polyamine which is at least a triamine are heated until two mols of water are removed. Of course, if the acylating substance is a glceride, then on a molar basis only one-third as much is used as compared with the molar quantity of fatty acid used.

In the practice of this invention, the partial amide reactant is used in the form of any one of its water-soluble, water-dispersible or water insoluble organic soluble salts. Thus, for example, organic and inorganic acid salts such as acetic acid salts, propionic acid salts, hydrochloric acid salts, phosphoric acid salts, sulfuric acid salts, etc., of the partial amides can be employed. These salts are, of course, derived from acetic acid, propionic acid, hydrochloric acid, phosphoric acid and sulfuric acid respectively. In addition, salts of suitable partial amides produced from organic and inorganic acids other than those specifically mentioned heretofore can be used. The amount of acid which is used must be sufficient to react with all of the basic constituents in the partial amide. That is, the amount of acid must be stoichiometrically equivalent to the basic nitrogen of the partial amide. For instance, if the partial amide is a monoamide obtained from one mol of a fatty acid and a triamine, then sufficient acid must be used to neutralize two basic nitrogens, i.e., two equivalents of acid are required. In other words, conversion to the salt is complete.

The manufacture of the partial amide is not a part of the present invention. The methods of which the partial amides can be produced are well known in the art and products produced by any of these methods can be used in the practice of this invention. Hence, the invention is not to be construed as restricted to the use of any particular partial amides. Likewise, partial amide salts are well known that the invention is not to be limited to the particular salts described herein.

In producing the novel products of this invention, a partial amide salt is reacted with a silicate salt. The silicate salt employed can be any of the various forms of sodium silicate, potassium silicate or ammonium silicate which are water-soluble or substantially water-soluble. Examples of useful silicate salts are sodium metasilicate ($Na_2O:SiO_2$), sodium orthosilicate ($2Na_2O:SiO_2$) or any other water-soluble sodium silicate, such as, sodium silicate having the composition $Na_2O:4SiO_2$ can be used, potassium silicate ($K_2O:SiO_2$) and ($K_2O:3.91SiO_2$), potassium tetrasilicate ($K_2O:4SiO_2.H_2O$) or any other water-soluble potassium silicate. The preferred products, however, are produced by reacting the partial amide salt with sodium silicate having the composition $Na_2O:3.22SiO_2$.

The precise nature of the reaction of the silicate salt and the salt of the partial amide is not known. It is believed that the sodium, potassium or ammonium ions of the silicate salt form a salt with the acid radicals of the partial amide salt and that the silica portion of the silicate salt combines with the amino nitrogen atoms of the partial amide reactant to produce the siliceous amino compound. However, the above theory should not be construed as limiting the scope of the invention.

In producing the siliceous amino compounds, the silicate salt is employed in quantities which are at least stoichiometrically equivalent to the quantity of partial amide salt with which it is to be reacted. For the purpose of this invention, a stoichiometrically equivalent quantity is that quantity of silicate salt which will provide sufficient sodium, potassium or ammonium ions to neutralize all of the acid radicals of the partial amide salt. The reaction of the partial amide salt and silicate salt may be achieved in various ways. Either one may be added as a solid or as a solution to a solution of the other. If desired, both materials, either as solids or as solutions can be simultaneously added to water with agitation. Any excess silicate salt which remains free and unreacted at the conclusion of the reaction is removed from the reaction product with which it is admixed by washing with water.

The preferred products of the invention are, however, produced by using quantities of silicate salt in excess of the stoichiometrically equivalent amount. The excess silicate salt is then converted with acid to silicon dioxide and the water-soluble sodium, potassium or ammonium salt of the acid. This silicon dioxide is also referred to as collodial silica and includes silica gel, silicic acid or hydrated silica. When, in the practice of the invention, excess silicate salt is employed, the silicon dioxide which is produced, when and if the reaction mixture is subsequently treated with acid, becomes suspended in the reaction mixture. The siliceous amino product resulting from the reaction of the silicate salt and the partial amide salt is absorbed on the silicon dioxide. The water-soluble sodium, potassium or ammonium salt of the acid which is produced as the incidental reaction product of this acid-treating step is soluble in the aqueous portion of the reaction medium and is removed from the water-insoluble product of the invention when the product is separated from the reaction medium as for example by filtration.

The silica portion of the silicate salt which is utilized in the formation of the siliceous amino compound is referred to as combined silica. Any excess silicate salt which is converted to silicon dioxide is referred to as free or uncombined silica or colloidal silica.

In general, any organic or inorganic acid which is capable of converting the unreacted silicate salt present in the reaction mixture to silicon dioxide and a readily water-soluble salt of the acid can be used in this step. Aliphatic carboxylic acids containing up to about six carbon atoms and dicarboxylic acids have been found suitable for this purpose. However, mineral acids are preferably employed. Thus, acids such as, acetic acid, propionic acid, butyric acid, caproic acid, oxalic acid, hydrochloric acid, phosphoric acid and sulfuric acid are espically well suited for such use. However, it will be apparent to those skilled in the art that the invention need not be limited solely to the use of the specific acids heretofore named. The amounts of acid used to convert the excess silicate salt to silicon dioxide is the theoretically equivalent quantity of acid which will react therewith to produce silicon dioxide and a water-soluble salt of the acid. It has been found that the introduction of a quantity of acid into the reaction mixture which is in excess of that theoretically required to convert all of the unreacted silicate salt present to silicon dioxide tends to break down the siliceous amino compound. Hence, such excess is to be avoided.

The silicate salt can be used in such excess quantities that the silicon dioxide (silica) produced when the excess silicate salt is treated with an acid, plus the silica which is combined with the partial amide to form the siliceous amino compound comprises up to about 95% by weight of the product, based upon the total weight of partial amide, combined silica and silicon dioxide (uncombined silica) present in the final product. Concomitantly, the partial amide portion which is combined with silica comprises not less than about 5% by weight of the above. As stated previously, the quantity of organic liquid introduced is not less than about 20% by weight based upon the total weight of organic liquid, partial amide, combined and uncombined silica, if present. If the organic liquid is non-volatile, it, of course, will remain absorbed on the final product.

There are several other procedures for introducing uncombined silica into the product besides converting excess silicate salt to silica. Regardless of its introduction, the uncombined silica is present in the final product in an amount so that it plus the combined silica comprises up to 95% by weight of the final product, based upon the total weight of partial amide, combined and uncombined silica. For example, the partial amide salt and a stoichiometrically equivalent amount of silicate solution can be added simultaneously to a solution already containing collodial silica such as silica gel, silica sol or pyrogenic silica. The preparation per se of silica gels and sols is well known in the art and such preparation does not form a part of the present invention. Another variant is to add the partial amide salt to a silicate solution in which a portion of the silicate salt has been converted to a gel or sol and the remaining unconverted silicate salt is stoichiometrically equivalent to the amount of partial amide salt which is introduced. Also, if desired, the partial amide salt can be introduced into water with agitation simultaneously with a stoichiometric excess of soluble silicate and sufficent acid to convert the excess silicate to the free silica. A preferred procedure is to introduce the partial amide salt plus excess silicate salt into a solution of a gel or sol which was prepared under acid conditions and thereby contains the acid necessary to convert the excess silicate salt to silica. Thus, the uncombined silica can be introduced before, during or after the formation of the siliceous amino compound.

The organic liquid, as stated before, is preferably present during the formation of the siliceous amino compound so that it can faborably influence fine particle formation. That is, the organic liquid is introduced at the time of or prior to the formation of the siliceous amino compound. For instance, the partial amide can be dissolved into the organic liquid and thereafter the acid can be added to form the salt, following which, water is introduced until a uniform dispersion is formed or the salt can be formed in the organic liquid and no water added. Alternatively, the partial amide salt is formed in aqueous solution and then the organic liquid is dispersed therein. In these alternatives, the organic liquid will be present when the partial amide salt is reacted with the water soluble silicate. Although a less preferred procedure, the siliceous amino compound can be prepared in aqueous medium, added to the silica sol or gel and then the organic liquid introduced. If the organic liquid is added after both the silica and siliceous amino compound are formed, it will aid filtration and reduce aggregate formation during drying even though it has been added at a time after which it favorably influences fine particle formation. In other words, the advantages of the present process can be achieved if the organic liquid material is present before, during or after the formation of the siliceous amino compound. This means also that the organic liquid can be present before, during or after the formation of silica (uncombined).

The organic liquid can be one of many materials so long as it has the property of being a water-insoluble or substantially water-insoluble organic liquid. The wide selection of liquid organic materials which can be utilized herein is attributable to the very high capacity of the siliceous amino compounds for absorbing organic liquids. A partial list which is exemplary of suitable organic liquids which are water-insoluble or substantially water-insoluble is as follows: aliphatic monohydroxy alcohols such as n-butanol, hexanol, heptanol; ketones such as dibenzyl ketone and methyl isobutyl ketone; aldehydes such as caproaldehyde and capricaldehyde; hydrocarbons such as benzene, toluene, xylene, cyclohexane, Tetralin, Decalin, kerosene, naphtha, Varsol and other mixtures of hydrocarbons having variable boiling ranges depending upon their specific constituents; halogenated hydrocarbons such as perchloroethylene, ethylene dichloride, carbon tetrachloride and butyl chloride; animal, vegetable and fish oils such as tallow, peanut, coconut, herring, sardine and linseed oils; esters such as methyl oleate, dioctyl phthalate, dioctyl sebacate, tributyl phosphate, tricresyl phosphate and dibutyl carbonate; silicones such as methyl polysiloxane; phenols such as nonylphenol, dioctylphenol and said phenols condensed with up to two mols of ethylene oxide; water insoluble polyoxyalkylene glycols and derivatives thereof such as water insoluble polyoxypropylene glycols and their derivatives such as the water-insoluble "Ucons"; glycol ethers such as ethyl butyl "Cellosolve" and phenyl "Cellosolve"; acetals such as dichloroethyl formal; fluocarbons such as $C_5$ fluoalcohols; ethers such as butyl ether and dichloroethyl ether; mercaptans such as butyl mercaptan and thiocresol; pyridine borane; tributyl borane, etc. Also, materials which are solids at room etmperature but which can be liquified under the operating temperatures can be used, e.g., eicosane.

The preparation of these siliceous amino compounds making use of organic liquids can be carried out under atmospheric pressure using a wide range of temperatures, i.e., from just above the freezing point of the highter freezing component to just below the boiling point of the lowest boiling component or azeotrope of the water-organic liquid mixture. When a non-volatile organic liquid is used, the maximum temperature would be the boiling point of the water present which would be the lowest boiling component. The higher temperatures, i.e., of the order of 75° C. are preferred in order to obtain uniform distribution of the siliceous amino compounds. That is, under the higher temperatures if any of the partial amide should precipitate out as large particles, gummy masses, small lumps, etc., it will readily redisperse. If desired, the preparation can be carried out at superatmospheric pressures by using an autoclave. In such instances, of course, the temperatures are not limited to the boiling point of the lowest boiling component or azeotrope of the water-organic liquid mixture.

During the preparation of the siliceous amino compounds, whether or not such includes free silica, the pH will be on the alkaline side, i.e., above 7 due to the inherent nature of the materials present. However, in many instances the pH will be exceedingly high, e.g., of the order of 10. At such pH's, the absorption of the organic liquid material by the siliceous amino compound will be poor thereby reducing the effectiveness of the process. Hence, the pH of the material is adjusted to between about 6.5 and 9.5 by the addition of a water soluble acid, e.g., hydrochloric acid or sulfuric acid, when the siliceous amino compound is formed. This adjustment can also be carried out after the siliceous amino compound is formed and even after it is adsorbed upon the free silica if present.

When the siliceous amino compound is formed, whether or not there is excess silicon dioxide upon which it is adsorbed, it is in the form of a slurry. This slurry is filtered, washed and dried. As pointed out before, due to the present invention, increased filtration rates are achieved and the product, upon drying, can easily be reduced to a fine powder.

Other variations in the process are as follows. For instance, the digestion period of the silica is optional and is carried out to build up the silica particles to a size desired for oil and solvent thickening which is of value in grease making. Wherever water is called for, its quantity may be varied widely. Enough should be used, however, to keep the system containing the siliceous amino compound in the form of an easily mixable slurry. As pointed out previously, the partial amide salt can be prepared in the absence of water and the silicate salts which are reacted with the partial amide salts can be introduced as solid materials. The washing of the filter cake comprising the siliceous amino compound can be either batchwise or continuous and after the final washing, the filter cake can be slurried and milled, e.g., using a ball mill, roll mill, colloid mill or homogenizer to reduce the particle size. The drying methods can vary, i.e., tray drying, vacuum drying, spray drying or drying while grinding can be used. After drying, mills such as a hammer mill, jet mill, attrition mill can be used to reduce the siliceous material. Moreover, if a fine silica, free from organic material is desired, the siliceous amino compound, whether or not it contains uncombined silica can be ignited before or after drying. Finally, the product can be irradiated, e.g., by exposure to gamma (cobalt 60 source) or neutron (nuclear reactor) irradiation prior to grinding in order to aid the formation of fine particles.

Also, if a volatile organic liquid is used, it can be removed at any point after the product in the form of its filter cake is collected. Such product is referred to as an unoiled siliceous amino compound. Removal can be done during the drying, by flash evaporation or by stepwise replacement with more volatile organic solvents. When a non-volatile organic liquid is used, the final product is referred to as an oiled siliceous amino compound.

It has also been found that the present process can be successfully applied to the preparation of other organic siliceous amino compounds in addition to the previously described siliceous amino compounds. For example, amine salts, i.e., amine acid addition salts and quaternary ammonium salts can be used in lieu of the parital amide salts in reaction with the silicate salts. When these amine and quaternary ammonium salts are reacted with the silicate salts as described herein, an improved product is obtained when compared with products prepared in accordance with the procedure disclosed in Serial No. 534,162. For example, finer and softer particles are obtained. Filtration rates are improved and aggregate formation and shrinkage are reduced. Examples of suitable primary, secondary and tertiary amines which can be used are Primene JM-T, lauryl amine, dioctyl amine, stearylamine, tricapryl amine, methyl lauryl amine, dimethyl soya amine. These amines are treated with an acid in any conventional manner to prepare their acid addition salts. Suitable acids are hydrochloric acid, sulfuric acid, phosphoric acid, acetic acid, propionic acid, etc.

Useful quaternary ammonium salts are dimethyl dioctadecyl ammonium chloride, trimethyl soya ammonium chloride, trimethyl tallow ammonium chloride, dimethyl dicoco ammonium chloride.

When amine salts are used in lieu of partial amide salts, the various procedures and proportions utilized with regard to the partial amide salts will also apply here.

In the examples wherever a grease is prepared, the oil, unless specified, was a 300 second Saybolt viscosity naphthenic base oil. Of course, other oils such as paraffinic, asphaltic, Mid-Continent, silicones, "Ucon" lubricants and adipic and phthalic diesters can be used. When such greases are prepared, they can contain from about 8.0% to about 40% by weight of the products prepared according to the process disclosed herein. These percents are percent of solids, that is, they exclude the weight of the organic liquid if it is present, i.e., absorbed on the siliceous amino compounds.

Wherever percent shrinkage of the filter cake is given, these values are percent by volume. Wherever penetration values are set forth, the procdure, A.S.T.M. cone penetration D217–52T was used. Wherever the grease was worked prior to penetration determinations, this was done by a motor driven grease worker described in A.S.T.M. D217–52T.

Thus, because of the present process, it is now possible to employ in grease base formulations, siliceous amino compounds in which the partial amide content is less than 25% by weight of the total or the number of amino groups and carbon atoms in the partial amide are reduced since such material can now be more easily prepared and be obtained in an improved form. Also, because it is now possible to prepare siliceous amino compounds having reduced quantities of partial amide, these materials can be used as flatting agents for varnishes whereas materials having 30% by weight of partial amide, e.g., partial amide of hydrogenated tallow fatty acids and tetraethylene pentamine, have a tendency to yellow or darken the varnish films. Also, the materials containing the higher amounts of partial amide reduced the efficiency of peroxides (e.g., benzoyl peroxide) when used as reinforcing fillers in the preparation of silicone rubber whereas the materials containing the lower amounts of partial amides were found to be more satisfactory. On the other hand, siliceous amino compounds having a high partial amide content can be used to cure polyesters because of the large number of amino groups which are present. These same materials are also useful as mold release agents or solid lubricants. In such uses as flatting agents for paints, lacquers and varnishes, natural or synthetic rubber additives or stabilizers for halogen containing vinyl polymers, where the oil in the oiled siliceous amino compound would not prove satisfactory, the siliceous amino compounds can be prepared with volatile solvents which are subsequently removed or the oil can be replaced with other non-volatile liquids which would not be objectionable.

Other uses, especially for unoiled siliceous amino compounds prepared in accordance with the process disclosed herein are as follows: gas purification, recovery or removal or organic materials from aqueous systems, deemulsification of aqueous organic systems, elevation of melting points, increase of hot viscosity of waxes and resins, thickeners for plastisols, plastigels and organosols and in the case of wire drawing, both oiled and unoiled siliceous amino compounds can be used. Thus, the wide selectivity of organic liquids which can be utilized herein as well as the results accruing from their use in the process herein is responible for the preparation of materials having many uses.

When the oiled siliceous amino compounds are used, they can contain from about 25% to about 200% of non-volatile organic liquid absorbed thereon based on the weight of siliceous amino compound plus free silica, if present. These oiled materials are characterized by having lower bulking values when compared with the unoiled products. Also, there is less dusting during handling and they incorporate much easier in organic liquids when compared with the unoiled products.

The following describes more fully the advantages in grease preparation by using siliceous amino compounds which can now be prepared in an excellent manner according to the procedure described herein and which contain reduced amounts of partial amide, as well as reduced number of amino groups and carbon atoms in the partial amide portion.

The siliceous amino compound prepared from the monoamide of hydrogenated tallow fatty acids and tetraethylene pentamine and sodium silicate (40° Bé. solution of $Na_2O:3.22\ SiO_2$) as taught in copending application Serial No. 534,162 and having a monoamide to total silica (free plus combined) weight ratio of 30:70 was a very fine material. The approximate particle size by nitrogen adsorption was 35 millimicrons. In order to make this 30:70 siliceous amino compound incorporate readily into oil for grease preparation with a minimum of dusting, the 30:70 siliceous amino compound was sprayed with 9.0% by weight of the siliceous amino compound of a 300 second viscosity naphthenic base oil. However, treatment in this manner merely coated the siliceous amino compound. The oil had no effect on the particle size or the grease making properties of the siliceous amino compound.

This 30:70 siliceous amino compound had good thickening properties, i.e., a grease containing 20% by weight of same and which was prepared by simple mixing had an A.S.T.M. penetration of 320. However, after passage through a colloid mill or homogenizer the A.S.T.M. penetration increased to 337 showing poor mechanical stability. Also, after heating to 150° C., cooling to 25° C., and working 500 times the grease liquified showing poor thermal stability.

As indicated previously, it was discovered that as the number of amino groups, the percent of partial amide, and the chain length of fatty material decrease in the siliceous amino compounds, the thickening properties of the siliceous amino compounds in oil increased and the resulting grease had improved mechanical and thermal stability (the property of a grease to maintain its consistency after being heated to 150° C., cooled to 20° to 25° C., and then worked 500 times).

The following table discloses a siliceous amino compound, its theoretical ratio of monoamide to total silica, the A.S.T.M. grease penetration of the pre-mix (simple mixing of oil and siliceous amino compound) and the A.S.T.M. grease penetration after passage through a Premier Colloid Mill (0.002" clearance, approximately 3000 r.p.m.). The penetration for the hot grease as it came out of the mill and for the grease after it cooled to approximately room temperature are given. The oil used was 300 sec. Saybolt viscosity naphthenic base oil. In the following table, HTF represents hydrogenated tallow fatty acids and DET represents diethylene triamine.

| Monoamide | Ratio of Monoamide to Total Silica (percent by wt.) | | Grease Solids (percent by wt. of siliceous amino compound) | ASTM Penetration | |
|---|---|---|---|---|---|
| | Monoamide | Silica | | Pre-Mix | Colloid Mill |
| HTF-DET | 30 | 70 | 20 | 340 | 280 (70° C.). 380 (25° C., 1,000 workings). |
| HTF-DET | 20 | 80 | 20 | 380 | 245 (70° C.). 260 (25° C., 1,000 workings). |
| HTF-DET | 20 | 80 | 15 | 420+ | 360 (25° C., 1,000 workings). |

Thus, by using the same amount or even a lesser amount, i.e., 15% by weight of the grease, of a 20:80 siliceous amino compound, greater oil bodying and greater mechanical stability after 1000 workings was achieved when compared with the same or greater amount of a siliceous amino compound having a 30:70 ratio.

The penetration values of a grease containing 17.5% by weight of the above 20:80 siliceous amino compound and a grease containing 15% by weight of a 10:90 ratio siliceous amino compound prepared from the monoamide of hydrogenated tallow fatty acids and diethylene triamine, both greases prepared in a Morehouse mill, were determined over a heating and cooling cycle and the data set forth in the table below. The numerical values are penetration values.

| | Siliceous amino compound having a wt. ratio of 20:80 used to prepare a 17.5% grease | Siliceous amino compound having a wt. ratio of 10:90 used to prepare a 15% grease |
|---|---|---|
| Heating: | | |
| 25° C | 330 | 380 |
| 100° C | 310 | 382 |
| 150° C | 315 | 380 |
| Cooling: | | |
| 100° C | 315 | 380 |
| 25° C | 400 | 380 |

The data in the immediately preceding table indicates poor thermal stability in the grease containing the 20:80 siliceous amino compound since the penetration value at room temperature increased after exposure to a heating and cooling cycle. On the other hand, the grease containing the 10:90 siliceous amino compound demonstrated no increase in penetration values after exposure to the heating and cooling cycle. This is evidence of good thermal stability.

As all of the above data show, when the percent partial amide constituent of the siliceous amino compound is reduced, the oil bodying properties, mechanical stability and thermal stability increased. In connection with this, it was previously stated that a grease containing 20% by weight of a 30:70 siliceous amino compound (prepared from hydrogenated tallow fatty acids and tetraethylene pentamine) demonstrated poor thermal stability, i.e., liquified after heating to 150° C. cooling and working. The unique feature of these siliceous amino compounds to increase grease penetration (or oil bodying) at elevated temperatures was not present at 10:90 ratios because of dilution by the large amounts of silicon dioxide, however, this property was present to the extent that in the 10:90 grease, the penetration, although it did not increase at elevated temperatures, did not decrease.

EXAMPLE I

This example demonstrates an unsatisfactory product obtained when insufficient water-insoluble organic liquid is used in the preparation of a product in which the number of carbon atoms in the partial amide is reduced.

(A) *Preparation of the monoamide salt.*—12.5 grams of the monoamide of Neo Fat 12 (90% pure lauric acid of Armour and Co.) and diethylene triamine were dissolved in 12.5 grams of a naphthenic base oil (300 second Saybolt viscosity) at 80° to 85° C. To this mixture was added 231 cc. of water heated to 80° to 85° C. After cooling to 75° C., 5.6 grams of glacial acetic acid were added to form the monoamide acetate salt. The temperature of the emulsion of the monoamide salt was maintained at 70° to 75° C.

(B) *Preparation of the siliceous amino compound.*— The dispersion of the monoamide salt prepared above was added in a slow steady stream with agitation to an excess of a sodium silicate solution prepared by mixing 402.5 grams of sodium silicate (40° Bé. solution of $Na_2O:3.22$ $SiO_2$) with 2500 cc. of water. After the addition, agitation was continued for one-half hour at 70° to 75° C. The formation of the siliceous amino compound was indicated by the appearance of a yellow precipitate. To the above, 100.0 grams of hydrochloric acid (37.5%) were introduced in a dropwise manner to convert the excess sodium silicate to silica. The resulting slurry was mixed for one-half hour. Its pH was 7.5. The slurry was then digested at room temperature for 21 hours, heated to 70° C. and filtered. The filter cake was washed four times, each time by slurrying for 20 minutes with 1500 cc. of water heated to 70° to 75° C. and then filtering. The filtration rate was 3 to 4 minutes for each 1000 ml. of filtrate when filtered through an eight inch diameter Büchner filter under 25 to 28 inches vacuum. The wet filter cake was tray dried at 200° to 210° F. to a moisture content of 0.3%. The shrinkage during drying was 50% by volume. The cake dried to very hard aggregated chunks which were difficult to grind. This is because there was present only 10% of oil based upon the weight of the siliceous amino compound plus silica with the short chain monoamide. The theoretical composition of the product was 9.1% by weight of oil, 9.1% by weight of monoamide and 81.8% by weight of silica (free silica plus that combined with the monoamide). The composition can also be expressed as 10% by weight monoamide and 90% by weight of silica (free silica plus that combined with the monoamide) ignoring the oil.

EXAMPLE II (A) *Preparation of the monoamide salt.*—15.0 grams of the monoamide prepared from hydrogenated tallow fatty acids and diethylene triamine were melted at 100° C. to 105° C. and dispersed into 280 cc. of water maintained at a temperature of 80° to 85° C. To this dispersion, 5.6 grams of glacial acetic acid were added to form the acetate salt of the monoamide. To the resulting monoamide salt, 45.0 grams of a solvent refined paraffinic oil (1060 second Saybolt viscosity) were dispersed therein at 75° to 80° C. The resulting emulsion was held at a temperature of 75° to 80° C. to keep the monoamide acetate salt in solution.

(B) *Preparation of the siliceous amino compound.*— The dispersion of the monoamide salt prepared above was added in a slow steady stream with agitation to an excess of a sodium silicate solution prepared by dissolving 305.0 grams of sodium silicate (40° Bé. solution of $Na_2O:3.22$ $SiO_2$) in 2850 cc. of water. The temperature during addition was maintained at 70° to 75° C. The resulting yellowish dispersion of the siliceous amino compound and excess sodium silicate was agitated for one-half hour at 70° to 75° C.

A solution containing 70.0 grams of hydrochloric acid (37.1%) diluted with 70 cc. of water was slowly added in a dropwise manner to the above dispersion to convert the excess sodium silicate to silica. This addition was accompanied with agitation. The pH of the resulting slurry was adjusted to 7.9 by addition of approximately 2.0 grams of hydrochloric acid (37.1%). The slurry was then digested at room temperature for 22 hours after which it was heated to 72° C. and filtered. The filter cake was washed four times, each time by slurrying with 1500 cc. of water for 20 minutes at 70° to 75° C. and then filtering. Filtration rates were 2–3.5 minutes per 1000 ml. filtrate. The wet filter cake after the last washing was tray dried at 170° to 175° F. for 24 hours. The moisture content after drying was 0.3%. Finally, the dried siliceous amino compound was ground to a fine powder. The theoretical composition of the product was 31.1% by weight of oil, 10.3% by weight of monoamide and 58.6% by weight of silica (free silica plus that combined with the monoamide). The oil amounted to about 45% by weight of the siliceous amino compound plus the silica. The composition can also be expressed as 15% by weight monoamide and 85% by weight of silica (free silica plus that combined with the monoamide) ignoring the oil.

EXAMPLE III (A) *Preparation of silica gel.*—95.0 grams of hydrochloric acid (37%) diluted with 95 cc. of water were slowly added dropwise over a period of one hour with agitation to a sodium silicate solution prepared by mixing 402.5 grams of sodium silicate (40° Bé. solution of $Na_2O:3.22$ $SiO_2$) with 250 cc. of water to convert a portion of said sodium silicate to silica. The resulting silica sol was agitated for one hour at room temperature thereby forming a fluid silica gel which was digested at pH 8.8 for 22 hours at room temperature and then heated with agitation at 70° to 75° C.

(B) *Preparation of the monoamide salt.*—12.5 grams of the monoamide of Neo Fat 12 (90% pure lauric acid of Armour & Co.) and diethylene triamine were dissolved in 50.0 grams of naphthenic base oil (300 second Saybolt viscosity) at 70° to 75° C. To this mixture, 231 cc. of hot water (80° to 85° C.) were introduced after which 5.6 grams of glacial acetic acid were introduced in order to form the acetate salt of the monoamide. The resulting emulsion was agitated at 80° to 85° C.

(C) *Preparation of the siliceous amino compound.*— The emulsion of the acetate salt of the monoamide was then added to the silica sol prepared above with stirring at a temperature of 70° to 75° C. Stirring was continued for an additional one-half hour after which the pH was adjusted to 7.65 by the addition of 3.0 grams of hydrochloric acid (37%). The mixture was agitated for an additional hour from 70° to 75° C. and filtered. The filter cake was washed four times, each time by slurrying with 1500 cc. of water heated to 70° to 75° C. for 20 minutes and then filtering. The filtration rates were very rapid, i.e., 1 to 1½ minutes per 1000 ml. of filtrate when filtered through an eight inch diameter Büchner filter under 25 to 28 inches vacuum. The filter cake was tray dried to a moisture content of 0.4% by weight. The cake dried to crumbly powdery chunks which were very easy to grind. The theoretical composition of the siliceous amino product was 28.6% by weight of oil, 7.1% by weight of monoamide and 64.3% by weight of all of the silica (free silica plus that combined with the monoamide). Thus, the oil amounted to about 40% by weight of the siliceous amino compound plus silica.

EXAMPLE IV

The same procedure utilized in Example III was repeated except that 85.0 grams of the naphthenic base oil were used and 90.0 grams of hydrochloric acid (37.1%) were used to form the silica gel. Also, the pH of the siliceous amino compound was adjusted to 7.7 by the addition of 8.0 grams of hydrochloric acid (37.1%). In this example the filtration rate was ¾ to 1 minute for 1000 ml. of filtrate. The filter cake was dried for 24 hours at 70° to 75° C., i.e., until a moisture content of .03% was reached. The product was a slightly gritty powder which ground easily. Its theoretical composition was 40.5% by weight of oil, 5.9% monoamide and 53.6% silica (free silica plus that combined with the monoamide). The oil amounted to about 68% by weight of the siliceous amino compound plus uncombined silica.

EXAMPLE V (A) *Preparation of silica gel.*—46.2 grams of sulfuric acid (96%) dissolved in 185 cc. of water were added to a solution of 300.0 grams of sodium silicate (40° Bé. solution $Na_2O:3.22\ SiO_2$) diluted with 294 cc. of water as rapidly as possible without agitation. The solid hazy gel which formed was broken up and dispersed in 2500 cc. of water by agitating for two hours at 90° to 95° C. The dispersed gel was digested for 22 hours at room temperature and then heated with agitation from 80° to 85° C.

(B) *Preparation of the partial amide salt.*—12.5 grams of the monoamide of the Neo Fat 8 (90% pure caprylic acid, of Armour & Co.) and aminoethylethanolamine were dissolved in 42 grams of naphthenic base oil (300 second Saybolt viscosity) at 80° to 85° C. Then 3.3 grams of glacial acetic acid were introduced to form the acetate salt of the monoamide. Finally, 189 cc. of water was added at 85° to 90° C.

(C) *Preparation of the siliceous amino compound.*— To the gel prepared above were added in steady dropwise streams the solution of the salt of the monoamide and a solution of 102.5 grams of sodium silicate (40° Bé. solution $Na_2O:3.22\ SiO_2$) dissolved in 102.5 cc. of water. During the addition which was accompanied with agitation the monoamide salt solution was kept in excess. Upon completion of the addition, the pH of the slurry of the siliceous amino compound was 10.5. At this pH free unabsorbed oil was visible in the slurry. As the pH was lowered by the addition of the sulfuric acid, the free oil was absorbed. At a pH of 9.0 the oil was completely absorbed. The pH was finally adjusted to 7.4 and a total of 5.3 grams of sulfuric acid (96%) was used. The slurry was agitated for one hour at 80° to 85° C. and subsequently digested for 18 hours at room temperature. Afterwards, the digested slurry was heated to 70° to 75° C., washed to remove the water soluble salts, dried and ground. The filtration rate was 1.5 to 5 minutes for each 1000 ml. of filtrate. The oiled siliceous amino compound dried to powdery chunks which ground readily. Shrinkage during drying was 10% by volume. The theoretical composition of the product was 25.0% by weight of oil, 7.5% by weight of monoamide and 67.5% by weight of silica (free silica plus silica combined with the monoamide). The oil amounted to about 33% by weight of the siliceous amino compound plus uncombined silica.

EXAMPLE VI (A) *Preparation of silica sol.*—A solution prepared by diluting 290.0 grams of sodium silicate (40° Bé. solution $Na_2O:3.22\ SiO_2$) with 290 cc. of water and another solution containing 45.0 grams of sulfuric acid (96%) dissolved in 250 cc. of water were added slowly and simultaneously to a rapidly agitated beaker containing 2000 cc. of water. During addition, the sulfuric acid solution was introduced at such a rate that it was always in excess of the sodium silicate solution and so that the reaction mass was at all times acid to Congo red paper. This indicated that there was excess acid present in the sol. The resulting clear silica sol was digested at room temperature for 22 hours. 1.1 grams of lithium hydroxide dissolved in 20 cc. of water were mixed into the silica sol at 85° to 90° C. in order to stabilize it.

(B) *Preparation of the partial amide salt.*—12.5 grams of the monoamide of 2-ethyl hexoic acid and aminoethylethanolamine were melted at 55° to 60° C. and mixed with 3.3 grams of glacial acid. The resulting acetate salt of the partial amide was dissolved in 166 cc. of water at 80° to 85° C.

(C) *Preparation of the siliceous amino compound.*— The solution of the partial amide acetate plus a solution of 112.5 grams of sodium silicate (40° Bé. solution $Na_2O:3.22\ SiO_2$) diluted with 112.5 cc. of water were added to the previously prepared silica sol accompanied by rapid agitation. This amount of sodium silicate was sufficient to react with all of the partial amide salt to form the siliceous amino compound and to react with most of the free acid in the silica sol to form additional silica. During the addition, the monoamide salt was always kept in excess. After the addition was completed and the siliceous amino compound was formed, 125 grams of naphthenic base oil (300 second Saybolt viscosity) were introduced to the slurry. The pH of the slurry was 9.95 and free unabsorbed oil was present. The pH of the slurry was lowered by the addition of 6.0 grams of sulfuric acid (96%). It was observed that the oil absorbed completely at a pH 8.1. The final pH was 7.2. The slurry was then agitated for 15 minutes at 85° to 90° C. and further agitated while cooling at 30° C. It was then digested for 22 hours at room temperature. Thereafter, the material was heated to 70° to 75° C. stirred, washed, dried and ground. Shrinkage during drying was 34% by volume. The oiled siliceous amino compound of this example dried to soft chunks which readily ground to a fine powder. The product had a theoretical composition of 5.0% by weight of monoamide, 45.0% by weight of silica (free silica plus that combined with the monoamide) and 50.0% by weight of oil. The oil thus amounted to 100% by weight of the siliceous amino compound plus uncombined silica.

EXAMPLE VII

The procedure of Example VI was repeated with the following exceptions. In this example the diamide of 2-ethyl hexoic acid and diethylene triamine was used in place of the monoamide of Example VI. Also, 28° Bé. paraffin oil was used in place of the naphthenic oil. In preparing the partial amide acetate salt, 3.0 gms. of glacial acetic acid were used. In the preparation of the silica sol, a total of 51.7 gms. (96%) of sulfuric acid was used. The slurry of the siliceous amino compound was formed at a pH of 9.8 and there was present free unabsorbed oil. As the pH was reduced to 8.5 and 8.0 a slight amount of free unabsorbed oil was present. When the pH was reduced to 7.4 all of the oil was absorbed. The resulting product, an oiled siliceous amino compound, dried to soft chunks which ground readily. Shrinkage during drying was 36.5% by volume.

EXAMPLE VIII (A) *Preparation of silica gel.*—To a solution of 366 grams of sodium silicate (40° Bé. solution $Na_2O:3.22$ $SiO_2$) diluted with 294 cc. of water and then mixed with 84 cc. of water were added as rapidly as possible without agitation 46.2 grams of sulfuric acid (96.1%) diluted with 185 cc. of water. A heavy hazy gel was formed. 84 cc. of water were introduced with agitation to break up the gel. This was followed by the introduction by 1000 cc. and 1250 cc. portions of water respectively. Agitation was continued for 2 hours at 80° to 85° C. followed by digestion of the dispersed silica gel for 22 hours at room temperature. Some silica gel particles (3 to 5 mm.) were visible at this point. Further heating with agitation at 70° to 75° C. was carried out.

(B) *Preparation of the partial amide salt.*—12.5 gms. of the monoamide of hydrogenated tallow fatty acids and aminoethylethanolamine were dissolved in 125 grams of naphthenic base oil (300 second Saybolt viscosity) at 80° to 85° C. A clear solution was formed. Then 3.3 grams of glacial acetic acid were added. The resulting salt was emulsified with 50 cc. of water followed by an additional 56 cc. of water heated to 90° to 95° C. A fairly stable cream yellow emulsion was thus obtained.

(C) *Preparation of the siliceous amino compound.*— The silica gel prepared above was agitated while slowly and simultaneously introducing therein the monoamide acetate salt and a solution prepared by diluting 66.5 grams of sodium silicate (40° Bé. solution $Na_2O:3.22$ $SiO_2$) with 66.5 cc. of water. A cream yellow precipitate was formed. During the addition, the quantity of monoamide salt was always kept in excess. In this manner the slurry remained mixable and did not set up to a heavy, difficult to mix gel. The pH of the slurry was adjusted to 6.5 by the addition of approximately 4.0 grams of sulfuric acid (96%) and then raised to a pH of 7.6 by the addition of 1.5 grams of sodium hydroxide introduced as a 50% by weight aqueous solution. The slurry was stirred for one-half hour at a temperature of 80° to 85° C., digested for 22 hours at room temperature, heated at 70° to 75° and filtered. The filter cake was washed 4 times, each time by slurrying for 20 minutes with 1500 cc. of water heated at 75° to 80° C. and filtering. The filtration rate was very rapid, i.e., less than ½ minute for each 1000 ml. of filtrate when filtered through an eight inch diameter Büchner filter under 25 to 28 inches of vacuum. The washed filter cake was tray dried at 150° to 155° F. to a moisture content of 0.2% by weight. Filter cake shrinkage during drying was only 2.4%. The oiled siliceous amino compound powdered during drying and ground very easily. It contained 10% by weight of partial amide and 90% by weight of silica (including free silica plus that combined with the partial amide). It contained 50% by weight oil, 5% by weight amide and 45% by weight of free and combined silica.

A portion of the above product was homogenized with naphthenic base oil (300 second Saybolt viscosity). Sufficient quantities were used so that the oiled siliceous amino compound comprised 20% by weight of the total composition. The resulting grease had a penetration of 385 using the A.S.T.M. procedure.

EXAMPLE IX (A) *Preparation of the silica gel.*—A solution of 41.8 grams of sulfuric acid (96%) dissolved in 167 cc. of water was poured as rapidly as possible and without agitation into a sodium silicate solution containing 310 grams of sodium silicate (40° Bé. solution $Na_2O:3.22$ $SiO_2$) which had been diluted with 270 cc. of water plus an additional 120 cc. of water. A heavy silica gel was formed which was then broken up and dispersed in 2453 cc. of water by mixing for one hour at 80° to 85° C. The dispersed silica which contained some 1 mm. gel particles was digested at room temperature for 22 hours and finally heated with agitation at 80° to 85° C.

(B) *Preparation of the partial amide salt.*—5.0 grams of the monoamide of hydrogenated fatty acids and aminoethylethanolamine were dissolved in 100 grams of naphthenic base oil (300 second Saybolt viscosity) after which 1.3 grams of glacial acetic acid were added. The resulting salt was emulsified with 95 cc. of water at 90° to 95° C.

(C) *Preparation of the siliceous amino compound.*— The emulsion of the partial amide salt plus a solution of 30.0 grams of sodium silicate (40° Bé. solution of $Na_2O:0:3.22$ $SiO_2$) dissolved in 30 cc. of water were added simultaneously in a dropwise manner to the previously prepared dispersed silica. The addition was made so that the partial amide salt was always in excess. The pH of the resulting milky yellow slurry was adjusted to 6.8 by the addition of 4.0 grams of sulfuric acid (96%) and then raised to a pH of 7.3 by the addition of 1.0 gram of sodium hydroxide introduced as a 50% by weight aqueous solution. The slurry was agitated for one hour at a temperature of 80° to 85° C. and digested at room temperature for 22 hours. It was then heated to 70° to 75° C. filtered, washed, dried and ground as indicated in Example VIII. The filtration rate varied from 1 to 20 minutes for 1000 ml. portions of the filtrate. This rate is very good when compared with the rate of a similar unoiled slurry which required 120 minutes to filter the same quantity. The filter cake shrinkage during drying was 17.8% by volume while the product obtained by not oiling shrunk about 50% and was too coarse to be considered for grease making. The oiled siliceous amino compound dried to powdery chunks which ground easily. The composition was 5% by weight partial amide and 95% by weight silica (free silica plus that combined with the partial amide). The product contained 50% by weight of oil or 100% by weight of oil based upon the weight of the siliceous amino compound plus uncombined silica.

A grease was prepared by homogenizing naphthenic base oil (300 second Saybolt viscosity) and a sufficient quantity of the oiled siliceous amino compound of this example so that it was present in the final grease composition in an amount of about 20% by weight. It had an A.S.T.M. penetration of 414 and had a viscosity of 18,560 cps. at room temperature as determined by a Brookfield viscosimeter (Model HV-B).

EXAMPLE X (A) *Preparation of silica sol.*—A solution of 100.0 grams of hydrochloric acid (37.6%) diluted with 200 cc. of water and a solution of 302.5 grams of sodium silicate (40° Bé. solution of $Na_2O:3.22$ $SiO_2$) diluted with 302.5 cc. of water were added simultaneously to 2200 cc. of water accompanied by agitation. The acid solution was kept in excess so that the reaction mass was always acid to Congo red paper. The resulting clear silica sol was digested for 22 hours at room temperature and then heated at 80° to 85° C.

(B) *Preparation of the partial amide salt.*—12.5 grams of the monoamide of hydrogenated tallow fatty acids and diethylene triamine were mixed with 4.6 grams of glacial acetic acid and 234 cc. of water at 90° to 95° C.

(C) *Preparation of the siliceous amino compound.*— The partial amide acetate salt plus a solution of 100.0 grams of sodium silicate (40° Bé. solution of $Na_2O:3.22$ $SiO_2$) diluted with 100 cc. of water were added at the same time slowly to the silca sol with agitation. During addition, the solution of the monoamide salt was kept in excess in order to minimize gel formation. When approximately one-half of the contents of the sodium silicate and partial amide salt solutions had been introduced in to the silca sol, 125 grams of naphthenic base oil (300 second Saybolt viscosity) were mixed in. This also helped to minimize gel formation. The addition took one hour.

The resulting yellowish slurry of the oiled siliceous amino compound had a pH of 8.1. It was subsequently adjusted to 7.35 by the addition of 3.0 grams of hydrochloric acid (37.6%). The slurry was agitated for approximately one hour and then cooled to 55° C. accompanied with agitation. The slurry was then digested for 22 hours at room temperature. The slurry was heated to 80° to 85° C., filtered and washed four times, each time by slurrying for 20 minutes with 1500 cc. of water at a temperature of 75° to 80° C. and then filtering. The rate of filtration was 3½ to 8 minutes per 1000 ml. of filtrate. The washed filter cake was dried at 150° to 155° F. to a moisture content of 0.5% by weight. The filter cake shrunk 38.3% by volume. A similar filter cake of a siliceous amino compound prepared in the absence of an oil demonstrated shrinkage of approximately 50%. The product of this example ground readily to a fine powder.

A portion of the product was homogenized with naphthenic base oil (300 second Saybolt viscosity). Quantities were used so that the oiled siliceous amino compound made up 25.0% by weight of the total. After homogenization, the grease had a viscosity of 16,320 cps. and a A.S.T.M. penetration of 402.

EXAMPLE XI (A) *Preparation of a silica gel.*—A solution containing 120 parts by weight of sodium silicate (40° Bé. solution of $Na_2O:3.22\ SiO_2$) diluted with 160 parts by weight of water was added to a solution of 18.45 parts by weight of sulfuric acid (96%) and 71 parts by weight of water. The addition was carried out as rapidly as possible. However, in this instance a clear silica gel was maintained during the addition of the sodium silicate solution to the acid solution because the gel was prepared under acid conditions. The resulting fluid silica gel was digested at room temperature for 18 to 22 hours.

(B) *Preparation of the partial amide salt.*—5.0 parts of the monoamide of hydrogenated tallow fatty acids and aminoethylethanolamine were dissolved in 50.0 parts by weight of naphthenic base oil (300 second Saybolt viscosity) at a temperature of 80° to 85° C. Thereafter, 1.32 parts by weight of glacial acetic acid were introduced to form the acetate salt. The product was emulsified by the addition of 42.5 parts by weight of water introduced at a temperature of 80° to 85° C.

(C) *Preparation of the siliceous amino compound.*— The silica gel prepared above was dispersed in 1000 parts by weight of water. To this solution, the partial amide salt and a solution of 41.0 parts by weight of sodium silicate (40° Bé. solution of $Na_2O:3.22\ SiO_2$) diluted with 41 parts by weight of water were simultaneously introduced with agitation at a temperature of 70° to 80° C. During the addition, the partial amide salt was kept in excess. The pH of the resulting slurry of the siliceous amino compound was adjusted to a pH of about 7.4 to 7.6 with dilute sulfuric acid. Agitation was then carried out for one hour at 70° to 80° C. and followed by digestion at room temperature for 18 to 22 hours. The product was then filtered, washed, dried and ground.

A portion of the above product was homogenized with 300 second Saybolt viscosity naphthenic base oil using quantities such that the oiled siliceous amino compound comprised 20% by weight of the total. The resulting grease had a Brookfield viscosity of 16,160 cps. and a A.S.T.M. penetration of 405.

EXAMPLE XII (A) *Preparation of the partial amide salt.*—30.0 grams of the monoamide prepared from dichlorostearic acid and diethylene triamine were dissolved in 560 grams of xylene at 75° to 80° C. To this solution, 5.8 grams of phosphoric acid (85%) were added to form the monoamide phosphate salt. The resulting clear solution was heated to 70° to 80° C.

(B) *Preparation of siliceous amino compound.*—The xylene solution of the partial amide phosphate salt was poured in a slow steady stream into a solution of 99.3 grams of potassium silicate ($K_2O:3.91\ SiO_2$) dissolved in 1900 cc. of water. This amount of silicate salt was in excess of that needed to react with the partial amide salt. The temperature during the addition was 70° to 75° C. The resulting brownish dispersion of the siliceous amino compound and excess potassium silicate was agitated for one-half hour at 70° to 75° C. A solution of 23.6 grams of phosphoric acid (85%) diluted with 110 cc. of water was slowly added to the brownish dispersion to convert the excess potassium silicate to silica. After mixing for 20 minutes at 70° to 75° C., small brown spheres of the siliceous amino compound plus excess silica floated on the surface of the liquid. The mother liquor had a pH of 7.45. The slurry which comprised the brown spheres plus the mother liquor was filtered. The filtration rate was one-half minute per 1000 ml. of filtrate, i.e., the filtration rate was very rapid. There was no free solvent (xylene) visible in the filtrate nor did the filtrate have a solvent odor. The filter cake was washed four times, each time by slurrying with a 1000 cc. portion of water for 20 minutes at 55° to 60° C. and then filtering. The small brown spheres after the last wash were dried at 150° to 155° F. to a volatile content of 0.5%. Finally, the dried siliceous amino compound was ground to a fine powder. The product contained 30% by weight amide and 70% by weight of silica (free and combined). The weight ratio of xylene to the product was 5.6:1.

EXAMPLE XIII (A) *Preparation of silica gel.*—401.6 grams of sodium silicate (40° Bé. solution of $Na_2O:3.22\ SiO_2$) were added to 2500 cc. of water at room temperature. 95 grams hydrochloric acid (37%) diluted with 95 cc. of water were then added dropwise. A heavy gel formed during the acid addition which was thinned out by continued agitation. It was digested for 22 hours at room temperature and heated to 70° to 75° C. The silica gel had a pH of 9.0.

(B) *Preparation of cocoamine salt.*—12.5 grams of cocoamine were mixed with 240 cc. of water at 65° to 70° C. and reacted with 4.5 grams of glacial acetic acid. Then, 50 grams of 300 second Saybolt viscosity naphthenic base oil were mixed into the clear cocoamine acetate solution. The oil dispersed readily. The dispersion was held at 70° to 75° C.

(C) *Preparation of the cocoamine silicate.*—The dispersion prepared in part B was poured slowly into the agitated and digested silica gel at 70° to 75° C. A viscous creamy slurry resulted which was mixed for one-half hour at 70° to 75° C. 5 ml. hydrochloric acid (37%) was added to adjust pH of the slurry to 7.35.

The slurry was filtered in a Büchner filter and the resulting filter cake washed four times, each time with a 1500 cc. portion of water at 70° to 75° C. for 20 minutes and filtered. The filtration rates were 1 to 2 minutes for 1000 ml. of filtrate. There was no visible free oil in the filtrates. The washed filter cake was dried at 145° to 150° F. for 48 hours to a moisture content of 0.3%. The product dried to yellowish powdery chunks which ground readily to a slightly gritty powder. The product had a weight ratio of cocoamine to free and combined silica of 10:90. The weight ratio of oil to siliceous amino compound plus free silica was 1:1.5.

A grease was prepared by adding a portion of the product of this example to an oil and passing the mixture twice through a colloid mill having 0.002 to 0.003 inch clearance. The grease contained 14% by weight of the product of Example XIII. The A.S.T.M. penetration after 1000 workings was 365.

EXAMPLE XIV (A) *Preparation of silica gel.*—The procedure of Example XIII (A) was used.

(B) *Preparation of dimethyl dioctadecyl ammonium silicate.*—16.6 grams of Arquad 2HT (dimethyl dioctadecyl ammonium chloride, 75% active, Armour & Co.) were added to 234 cc. of water at 80° to 85° C. after which 50 grams of 300 second Saybolt viscosity naphthenic base oil were added. The oil dispersed readily. This dispersion was poured slowly into the digested, agitated silica gel at 70° to 75° C. The resulting cream yellow slurry was mixed at 70° to 75° C. for one-half hour. The pH was adjusted to 7.9 by adding 8 ml. of hydrochloric acid (37%). The slurry was filtered and the filter cake was washed four times, each time by mixing with 1500 cc. of water at 70° to 75° C. for 20 minutes and filtering. There was no oil visible in the filtrates. The filtration rate was 1½ min. for 1000 ml. of filtrate. The washed filter cake was dried at 145° to 150° F. for 68 hours to a moisture content of 0.3%. The product dried to a brownish powder which ground readily to a fine powder. The product had a weight ratio of dimethyl dioctadecyl ammonium constituent to free plus combined silica of 10:90. The weight ratio of oil to siliceous amino compound plus free silica was 1:1.5.

EXAMPLE XV (A) *Preparation of silica gel.*—46.2 grams of sulfuric acid (96%) were dissolved in 190 cc. of water. Then 300 grams sodium silicate (40° Bé. solution $Na_2O:3.22SiO_2$) were added with agitation at a rate so that the reaction mass always remained clear. Agitation was continued for one-hour at 20° to 25° C. after which the gel was digested for 22 hours at room temperature. 2000 ml. of water were added and the gel was heated to 70° to 75° C.

(B) *Preparation of the monoamide salt.*—12.5 grams of the monoamide prepared from hydrogenated tallow fatty acids and aminoethylethanolamine were melted at 80° to 85° C. and reacted with 3.3 grams of glacial acetic acid. The resulting monoamide acetate was dissolved in 300 cc. of methyl isobutyl ketone at 55° C. and the resulting solution was heated to 65° to 70° C.

(C) *Preparation of the siliceous amino compound.*— The solution of the monoamide acetate and the ketone plus 102.5 grams of sodium silicate (40° Bé. solution $Na_2O:3.22SiO_2$) diluted with 102.5 ml. of water were added at the same time to the agitated silica gel keeping the monoamide acetate salt solution always in excess in order to minimize a heavy gel stage formation. The pH of the mother liquor was 9.6. The resulting slurry was adjusted to a pH of 7.4 by addition of 3.6 ml. of sulfuric acid (96%), mixed for one hour at 75° to 80° C. and digested for 22 hours at room temperature after which the slurry was heated to 40° to 45° C. and filtered. The filter cake was washed twice, each time by slurrying with a 1500 cc. portion of water at 30° to 35° C. and mixing for 15 minutes. For a 3rd wash, the filter cake was mixed with 1500 cc. of water at 30° to 35° C. after which 400 ml. of methyl isobutyl ketone were added. Agitation for 20 minutes at 30° to 35° C. was carried out after which the material was filtered. Filtration rates were 2½ to 8 minutes for 1000 ml. of filtrate. There was no visible ketone layer in the filtrates. The washed filter cake was dried at room temperature for 24 hours and then at 150° to 155° F. for another 24 hours to a voltaile content of 0.7%. Shrinkage during drying was 34.5%.

The filter cake dried to friable chunks which ground to a fine powder. The product had a weight ratio of monoamide to silica (free and combined) of 10:90. The weight ratio of organic liquid to siliceous amino compound and free silica was 1:0.178 thus demonstrating the high absorption of the organic liquid.

EXAMPLE XVI (A) *Preparation of silica sol.*—35 grams sulfuric acid (97.7%) diluted with 190 cc. of water and 225 grams of sodium silicate (40° Bé. solution $Na_2O:3.22SiO_2$) diluted with 225 ml. of water were added with agitation at the same time dropwise to 2200 cc. of water. During the addition, the acid was always maintained in excess so that the reaction mass was at all times acid to Congo red paper. The resulting clear silica sol (pH 2.5) was digested 22 hours at room temperature.

(B) *Preparation of the monoamide salt.*—15.0 grams of the monoamide prepared from hydrogenated tallow fatty acids and tetraethylene pentamine were dissolved in 100 grams of 300 second Saybolt viscosity naphthenic base oil at 85° to 90° C. Then 7.2 grams of glacial acetic acid were added. Finally 280 ml. of water were added and the resulting yellowish dispersion of the monoamide salt was agitated at 90° to 95° C.

(C) *Preparation of the siliceous amino compound.*— The monoamide salt prepared above plus 80 grams of sodium silicate (40° Bé. solution $Na_2O:3.22SiO_2$) were slowly added at the same time with agitation to the silica sol at 90° to 95° C. The mother liquor had a pH of 9.0. The pH of the resulting yellowish slurry was adjusted to 7.6 by mixing in 1.5 ml. of sulfuric acid (97.7%), mixed for one-half hour at 90° to 95° C. and filtered. The filter cake was washed four times, each time by mixing with a 1500 ml. portion of water at 70° to 75° C. for 20 minutes and filtering. Filtration rates were ½ to ¾ minutes for 1000 ml. of filtrate. No free oil was visible in the filtrate. The washed filter cake was dried for 24 hours at 150° to 155° F. to a moisture content of 0.4%. During drying, shrinkage was 32%. The filter cake dried to a powder which ground easily to a fine powder. The product had a weight ratio of monoamide to silica (free and combined) of 15:85. The weight ratio of oil to siliceous amino compound plus free silica was 1:1.

EXAMPLE XVII (A) *Preparation of silica sol.*—35 grams of sulfuric acid (97.7%) dissolved in 190 cc. of water and 225 grams of sodium silicate (40° Bé. solution $Na_2O:3.22SiO_2$) diluted with 225 ml of water were added dropwise and with agitation at the same time to 2200 ml. of water at room temperature. The rate of acid addition was such that it was always in excess of the sodium silicate so that reaction mass was at all times acid to Congo red paper. The clear silica sol which resulted had a pH of 2.5. The sol was digested for 21 hours at room temperature.

(B) *Preparation of the monoamide salt.*—15 grams of aminoamide prepared from naphthenic acids and diethylene triamine were dissolved in 100 grams of naphthenic base oil (300 second Saybolt viscosity) at 75° to 80° C. Then 5.9 grams of glacial acetic acid were added to the resulting clear solution to form the acetate salt. An emulsion was prepared with 280 cc. of water at 90° to 95° C. by stirring the water into the monoamide acetate oil solution.

(C) *Preparation of siliceous amino compound.*—A solution prepared by diluting 80 grams of a 40° Bé. solution of $Na_2O:3.22SiO_2$ with 80 ml. of water were added to the silica sol with agitation at 90° to 95° C. until a slight hazy gel formed. Then the remaining sodium silicate solution and monoamide acetate dispersion were added at the same time to the silica gel. The pH of the mother liquor was 9.7 which was adjusted to 7.75 by addition of 2.5 ml. of sulfuric acid (97.7%). Agitation was continued for one-half hour at 90° to 95° C. after which the slurry was filtered through a Büchner filter. The filter cake was washed four times, each time by mixing with a 1500 ml. portion of water at 70° to 75° C. for 20 minutes and filtering. The filtration rates were ¾ to 1 minute for 1000 ml. of filtrate. No free oil was visible in the filtrates. The washed filter cake was dried at 150° to 155° F. for 24 hours to a moisture content of 0.4%. Shrinkage during drying was 34.3%. The filter cake dried to a yellowish powder which ground easily to an unctuous powder. The product had a weight ratio of monoamide to silica (free and combined) of 15:85.

The weight ratio of oil to siliceous amino compound including the free silica was 1:1.

EXAMPLE XVIII (A) *Preparation of silica sol.*—This preparation was the same as in Example XVII.

(B) *Preparation of the amine salt.*—15 grams of Primene JM-T (a tertiary alkyl oil soluble primary amine of the formula R—NH$_2$ in which R, the tertiary alkyl group, contains from 18 to 24 carbon atoms and which has a molecular weight of 269 to 353, of Rohm and Haas) were dissolved in 100 grams of naphthenic base oil (300 second Saybolt viscosity) at room temperature. To the resulting clear solution 6.0 grams glacial acetic acid were added. Then 280 ml. of water was mixed with the resulting amine acetate solution at 90° to 95° C. to form an emulsion.

(C) *Preparation of the amine silicate compound.*—Approximately ⅓ of a solution obtained from 80 grams of sodium silicate (40° Bé. solution Na$_2$O:3.22SiO$_2$) diluted with 80 cc. of water was added dropwise to the agitated silica sol until a hazy thin gel formed. Then at 90° to 95° C. the amine acetate mixture and the remaining approximately ⅔ of the sodium silicate solution were added at the same time to the agitated silica gel. The mother liquor had a pH of 9.4 which was adjusted to 6.4 with 2 ml. sulfuric acid (97.7%). The amine silicate was not as strong an oil absorbent as the siliceous amino compounds for there were small amounts of free oil visible in the slurry. The slurry was filtered and the filter cake was washed three times by mixing each time with 1500 ml. portions of water at 70° to 75° C. for 20 minutes and then filtering. Filtration rates were 3 to 7 minutes for 1000 ml. filtrate. Small amounts of oily layers were visible in the filtrates.

The washed filter cake was dried at 150° to 155° F. for 24 hours to a moisture content of 0.4%. The oil loss during filtration was approximately 35 grams, therefore the theoretical composition of this oiled amine silicate was 9.09% by weight of amine, 51.51% by weight of free and combined silica and 39.4% by weight of oil. The amine and silica (free and combined) had a weight ratio of 15:85.

EXAMPLE XIX (A) *Preparation of silica sol.*—The procedure of Example XVII was used.

(B) *Preparation of the partial amide salt.*—15.0 grams of the monoamide prepared from 12-hydroxy stearic acid and diethylene triamine were dissolved in 100 grams of naphthenic base oil (300 second Saybolt viscosity) at 90° to 95° C. 4.7 grams of glacial acetic acid were then added to form the acetate salt. Finally, 280 cc. of water were added at 90° to 95° C.

(C) *Preparation of the siliceous amino compound.*—Approximately ⅓ of 80 grams of a sodium silicate solution (40° Bé. solution Na$_2$O:3.22SiO$_2$) were added dropwise to the agitated silica sol until a slightly hazy thin gel formed. It was then heated to 90° C. and the monamide salt and the remaining approximately two-thirds of the sodium silicate solution were added dropwise to the agitated silica gel at 90° to 95° C. The mother liquor of the resulting creamy slurry had a pH of 9.8 which was adjusted to 7.6 by addition of 2.5 ml. sulfuric acid (97.7%). No free oil was visible in the slurry. The slurry was filtered through a Büchner filter and the filter cake washed four times, each time by mixing with a 1500 cc. portion of water at 70° to 75° C. for 20 minutes and filtering. The filtration rates were very rapid, i.e., ½ to ¾ minute for 1000 ml. of filtrate. No visible free oil was observed in the filtrates. The washed filter cake was dried for 48 hours at 125° F. and then for 5 hours at 150° to 155° F. to a moisture content of 0.2%. The shrinkage during drying was 28.1%. The filter cake dried to porous chunks which ground easily to a powder. The product had a weight ratio of amide to silica (free and combined) of 15:85. The weight ratio of oil to siliceous amino compound plus free silica was 1:1.

EXAMPLE XX (A) *Preparation of silica sol.*—29 grams of sulfuric acid (97.7%) were dissolved in 190 cc. of water and 200 grams sodium silicate (40° Bé. solution Na$_2$O:3.22SiO$_2$) diluted with 200 ml. water were added at the same time dropwise to 1600 ml. water at room temperature with agitation. The acid was kept in excess so that reaction mass was at all times acid to Congo red paper. The resulting silica sol was mixed 15 minutes and then digested for 21 hours at room temperature.

(B) *Preparation of the partial amide salt.*—30 grams of a partial amide prepared from Neo Fat 12 and phenylene diamine were mixed with 20 grams naphthenic base oil (300 second Saybolt viscosity) at 80° to 85° C. and the mixture then added to 6.8 grams of glacial acetic acid. Finally, 552 cc. of water were added at 90° to 95° C.

(C) *Preparation of the siliceous amino compound.*—The partial amide mixture was slowly added to the agitated silica sol at 90° to 92° C. Then 50 grams of sodium silicate (40° Bé. solution Na$_2$O:3.22SiO$_2$) diluted with 50 ml. of water were added. The resulting slurry was stirred at 90° to 95° C. for 15 minutes. The mother liquor had a pH of 7.4. The slurry was filtered in a Büchner filter and the filter cake washed three times by mixing each time with 1500 ml. of water at 70° to 75° C. for 20 minutes and filtering. The filtration rate was three minutes per 1000 ml. of filtrate. No free oil was visible in the filtrate. The washed filter cake was dried at 150° to 155° F. for 24 hours to a moisture content of 0.3%.

The filter caked ried to brownish chunks which ground easily to a powder. The product had a weight ratio of partial amide to silica (free and combined) of 30:70. The weight ratio of oil to siliceous amino compound plus free silica was 1:5, i.e., the oil amounted to 20% by weight of the siliceous amino compound plus free silica.

EXAMPLE XXI (A) *Preparation of silica sol.*—35 grams of sulfuric acid (97.7%) dissolved in 190 ml. of water and 225 grams sodium silicate (40° Bé. solution Na$_2$O:3.22SiO$_2$) diluted with 225 ml. of water were added at the same time dropwise over a period of one-half hour to 2500 ml. of water at 25° to 30° C. with agitation. The acid was kept in excess so that the reaction mass was at all times acid to Congo red paper. The clear liquid silica sol was digested for 21 hours at room temperature and then heated to 90° to 95° C.

(B) *Preparation of the partial amide salt.*—15.0 grams of a monoamide prepared from hydrogenated tallow fatty acids and aminoethylethanolamine were dissolved in 100 grams naphthenic base oil (300 second Saybolt viscosity) at 85° to 90° C. Then 2.9 grams glacial acetic acid were added to the clear solution of the monoamide. Finally, 100 grams of toluene were added and the mixture heated to 90° to 95° C.

(C) *Preparation of the siliceous amino compound.*—The solution of the partial amide salt and 80 grams of sodium silicate (40° Bé. solution Na$_2$O:3.22SiO$_2$) were added dropwise at the same time (keeping the monoamide acetate solution in excess to minimize heavy gel formation stage) to the silica sol at 85° to 90° C. The mother liquor of the resulting creamy slurry had a pH of 9.7 whch was adjusted to 7.8 by addition of 2.2 ml. of sulfuric acid (97.7%). The slurrry was mixed for one-half hour at 85° to 90° C. There was a visible separation of the siliceous amino compound and the absorbed solvent from the aqueous portion of the mother liquor. The slurry was filtered through a Büchner filter and the filter cake was washed four times, each time with a 1500 cc. portion of water at 70° to 75° C. for 20 minutes and filtering. Filtration rates were ½ to 1½ minutes per 1000 ml. filtrate.

The washed filter cake was dried for 8 hours at 150° to 155° F. and then for 68 hours at 110° to 115° F. to a volatile content of 0.2%. The shrinkage during drying was 15.1% by volume.

The filter cake dried to porous chunks which ground readily to a powder. The product had a weight ratio of partial amide to silica (free plus combined) of 15:85. The weight ratio of organic liquid to the siliceous amino compound plus free silica was 2:1, the oil and toluene being present in equal amounts by weight.

EXAMPLE XXII (A) *Preparation of the partial amide salt.*—47.4 grams of a monoamide prepared from hydrogenated tallow fatty acids and diethylene triamine were dissolved in 31.4 grams of VM&P naphtha (boiling range of 245° F. to 295° F.) at 80° to 85° C. Then 18.0 grams of glacial acetic acid were added. A creamy dispersion was obtained by adding 427 cc. of water at 80° to 85° C.

(B) *Preparation of the siliceous amino compound.*— The dispersion of the partial amide salt prepared above was slowly added to 394 grams of sodium silicate (40° Bé. solution $Na_2O:3.22SiO_2$) which had been dissolved in 2666 cc. of water at 80° to 85° C. This amount of sodium silicate was in excess of the amount needed to react with the partial amide acetate. Mixing was carried out for one-half hour upon the resulting slurry of the siliceous amino compound.

(C) *Preparation of silica.*—A solution of hydrochloric acid prepared by diluting 75 grams of hydrochloric acid (37.2%) with 75 cc. of water was added slowly to the slurry of the siliceous amino compound prepared in part B in order to convert the excess sodium silicate to silica. The mother liquor of the slurry had a pH of 7.95 which was adjusted to 7.45 with 3.0 ml. hydrochloric acid (37.2%). The resulting yellowish slurry was stirred for one-half hour at 80° to 85° C. and filtered through a Büchner filter. The filter cake was washed four times, each time by mixing with a 1500 ml. portion of water at 80° to 85° C. for 20 minutes and filtering. Filtration rates were 2½ to 5 minutes per 1000 ml. of filtrate. No free solvent was visible in the clear filtrates. The washed filter cake was dried at 150° to 155° F. for 24 hours to a volatile content of 0.8%. Shrinkage during drying was 31.8% by volume.

The filter cake dried to yellowish porous chunks which ground easily to a powder. The product had a weight ratio of monoamide to silica (free and combined) of 30:70. The quantity of VM&P naphtha in the product was 31.4 grams and the quantity of siliceous amino compound plus free silica was 158 grams.

EXAMPLE XXIII (A) *Preparation of silica sol.*—The preparation of Example XXI was used except the heating of the sol to 90° to 95° C. after digestion was omitted.

(B) *Preparation of the monoamide salt.*—15.0 grams of the monoamide prepared from oleic acid and aminoethylethanolamine were dissolved in 100 grams of naphthenic base oil (300 second Saybolt viscosity) at 95° to 100° C. Thereafter, 2.9 grams of glacial acetic acid was added. Finally, the salt was emulsified with 280 ml. of water at 90° to 95° C.

(C) *Preparation of the siliceous amino compound.*— A portion of a sodium silicate solution prepared by diluting 80 grams of a 40° Bé. solution $Na_2O:3.22 SiO_2$ with 80 cc. of water was added dropwise at room temperature with agitation to the silica sol prepared above until a thin gel formed. The silica gel was heated to 90°–92° C. and the remaining sodium silicate solution and monoamide acetate emulsion were added dropwise at the same time at about equal rates. The resulting creamy slurry was stirred at 90° to 92° C. for one-half hour. The mother liquor of the slurry had a pH of 10.0. Free oil was visible; however, the oil was completely absorbed when the pH was adjusted to 8.3. The pH was finally adjusted to a pH of 7.8 by adding 2.4 ml. sulfuric acid (97.7%). The slurry was cooled to 75° C. and filtered through a Büchner filter. The filter cake was washed four times, each time by mixing with a 1500 ml. portion of water heated at 70° to 75° C. for 20 minutes and filtering. The filtration rates were ½ to 1½ minutes per 1000 ml. of filtrate. No free oil was visible in the clear filtrates. The washed filter cake was dried for 65 hours at 150° to 155° F. to a moisture content of 0.2%. Shrinkage during drying was 26.6% by volume. The filter cake dried to a yellowish powder which ground readily to a fine powder. The product had a weight ratio of monoamide to silica (free plus combined) of 15:85. The weight ratio of oil to siliceous amino compound plus free silica was 1:1.

A grease was prepared which contained 25.0% by weight of the product of this example. The oil used was 300 second Saybolt viscosity naphthenic base oil. It was prepared by homogenizing and using 2% by weight of the oil of acetone as a dispersant. The grease had an A.S.T.M. penetration of 385.

Having described my invention, what I claim as new and desire to secure by Letters Patent is:

1. A process for preparing a siliceous amino compound which comprises reacting (*a*) a salt of a nitrogen containing compound selected from the group consisting of lower carboxylic acid salts of unsubstituted higher aliphatic mono amines, mineral acid salts of unsubstituted higher aliphatic mono amines, quaternary ammonium salts of unsubstituted higher aliphatic mono amines and partial amide salts, the partial amide of said partial amide salt being the reaction product of an alkylene polyamine and a material selected from the group consisting of aliphatic monocarboxylic acids, their esters and their acyl halides containing the radical RCO—, wherein R represents a carbon chain length of from 5 to 21 carbon atoms, glycerides, naphthenic acid and tall oil and (*b*) of a water-soluble silicate salt selected from the group consisting of sodium silicates, potassium silicates and ammonium silicates said water-soluble silicate salt being present at least in an amount sufficient to neutralize all of the acid radicals of said nitrogen containing salt and introducing an organic liquid which is at least substantially water-insoluble in an amount of at least about 25% by weight of said siliceous amino compound, the pH of the reaction system being adjusted to between about 6.5 and 9.5 after said (*a*) and (*b*) are reacted thereby obtaining maximum adsorption of said organic liquid.

2. The process of claim 1 in which said water-soluble silicate salt is present in an approximately stoichiometrically equivalent quantity.

3. The process of claim 1 in which the organic liquid is present during the reaction between said salt of a nitrogen containing compound and said silicate salt.

4. The process of claim 1 in which said salt of a nitrogen containing compound is a partial amide salt, the partial amide thereof being the reaction product of an alkylene polyamine and a material selected from the group consisting of aliphatic monocarboxylic acids, their esters and their acyl halides containing the radical RCO—, wherein R represents a carbon chain length of from 5 to about 21 carbon atoms, glycerides, naphthenic acid and tall oil.

5. The process of claim 4 in which said salt of a nitrogen containing compound is an acid addition salt of the monoamide of aminoethylethanol amine and hydrogenated tallow fatty acids.

6. A process for preparing a siliceous amino compound which comprises reacting (*a*) a salt of a nitrogen containing compound selected from the group consisting of lower carboxylic acid salts of unsubstituted higher aliphatic mono amines, mineral acid salts of unsubstituted higher aliphatic mono amines, quaternary ammonium salts of unsubstituted higher aliphatic mono amines and partial amide salts, the partial amide of said partial amide salt being the reaction product of an alkylene polyamine and a material selected from the group consisting of aliphatic monocarboxylic acids, their esters and their acyl halides containing the radical RCO—, wherein R represents a carbon chain length of from 5 to about 21 carbon atoms, glycerides, naphthenic acid and tall oil and (b) and approximately stoichiometrically equivalent quantity of a water-soluble silicate salt selected from the group consisting of sodium silicates, potassium silicates and ammonium silicates sufficient to neutralize all of the acid radicals of said nitrogen containing salt and introducing an organic liquid which is at least substantially water insoluble, said reaction being carried out in the presence of a solution of colloidal silica present in an amount such that it plus the combined silica from said water soluble silicate which is combined with said nitrogen containing compound comprises up to about 95% by weight of the total amount of said nitrogen containing compound, combined silica and colloidal silica present in the final product, said organic liquid being present in an amount of at least about 25% by weight based on the weight of said nitrogen containing compound, combined silicate and colloidal silica, the pH of the reaction system being adjusted to between about 6.5 and 9.5 after said (a) and (b) are reacted thereby obtaining maximum adsorption of said organic liquid.

7. The process of claim 6 in which said organic liquid is present during the reaction between said salt of a nitrogen containing compound and said silicate salt.

8. The process of claim 6 in which said salt of a nitrogen containing compound is a partial amide salt, the partial amide thereof being the reaction product of an alkylene polyamine and a material selected from the group consisting of aliphatic monocarboxylic acids, their esters and their acyl halides containing the radical RCO—, wherein R represents a carbon chain length of from 5 to about 21 carbon atoms, glycerides, naphthenic acid and tall oil.

9. The process of claim 6 in which said salt is an acid addition salt of a partial amide of an alkylene polyamine and naphthenic acid.

10. The process of claim 6 in which said salt is an acid addition salt of a partial amide of an alkylene polyamine and tall oil.

11. The process of claim 6 in which said salt is an acid addition salt of a partial amide of an alkylene polyamine and hydrogenated tallow fatty acids.

12. The process of claim 6 in which said salt is an acid addition salt of the monoamide of aminoethylethanolamine and hydrogenated tallow fatty acids.

13. A process for preparing a siliceous amino compound which comprises reacting (a) a salt of a nitrogen containing compound selected from the group consisting of lower carboxylic acid salts of unsubstituted higher aliphatic mono amines, mineral acid salts of unsubstituted higher aliphatic mono amines, quaternary ammonium salts of unsubstituted higher aliphatic mono amines and partial amide salts, the partial amide of said partial amide salt being the reaction product of an alkylene polyamine and a material selected from the group consisting of aliphatic monocarboxylic acids, their esters and their acyl halides containing the radical RCO—, wherein R represents a carbon chain length of from 5 to about 21 carbon atoms, glycerides, naphthenic acid and tall oil and (b) a silicate salt selected from the group consisting of sodium silicates, potassium silicates and ammonium silicates, said reaction being carried out in the presence of a solution containing colloidal silica and acid, said silicate salt being sufficient to neutralize all of the acid radicals of said nitrogen containing salt and to provide for an excess of silicate salt which when contacted with the acid present in said solution of colloidal silica and acid will form colloidal silica in addition to that which is already present, the resulting colloidal silica plus the combined silica which is combined with said nitrogen containing compound being present in an amount up to about 95% by weight of said nitrogen containing compound, combined silica and colloidal silica in the final product, introducing an organic liquid which is at least substantially water-insoluble in an amount of at least about 25% by weight of said nitrogen containing compound, combined silica and colloidal silica and maintaining the pH of the reaction system at between about 6.5 to 9.5 thereby obtaining maximum adsorption of said organic liquid, said acid being present in an amount sufficient to react with said excess silicate salt.

14. The process of claim 13 in which said organic liquid is present during reaction between said salt of a nitrogen containing compound and said silicate salt.

15. The process of claim 13 in which said salt of a nitrogen containing compound is a partial amide salt, the said partial amide thereof being the reaction product of an alkylene polyamine and a material selected from the group consisting of aliphatic monocarboxylic acids, their esters and their acyl halides containing the radical RCO—, wherein R represents a carbon chain length of from 5 to about 21 carbon atoms, glycerides, naphthenic acid and tall oil.

16. The process of claim 13 in which said salt is an acid addition salt of a partial amide of an alkylene polyamine and naphthenic acid.

17. The process of claim 13 in which said salt is an acid addition salt of a partial amide of an alkylene polyamine and tall oil.

18. The process of claim 13 in which said salt is an acid addition salt of a partial amide of an alkylene polyamine and hydrogenated tallow fatty acids.

19. The process of claim 13 in which said salt is an acid addition salt of aminoethylethanolamine and hydrogenated tallow fatty acids.

20. The process of claim 13 in which said organic liquid is a naphthenic base oil.

21. The process of claim 13 in which said organic liquid is kerosene.

22. The process of claim 13 in which said organic liquid is xylene.

23. The process of claim 13 in which said organic liquid is naphtha.

24. A process for preparing a siliceous amino compound which comprises reacting (a) a salt of a nitrogen containing compound selected from the group consisting of lower carboxylic acid salts of unsubstituted higher aliphatic mono amines, mineral acid salts of unsubstituted higher aliphatic mono amines, quaternary ammonium salts of unsubstituted higher aliphatic mono amines and partial amide salts, the partial amide of said partial amide salt being the reaction product of an alkylene polyamine and a material selected from the group consisting of aliphatic monocarboxylic acids, their esters and their acyl halides containing the radical RCO—, wherein R represents a carbon chain length of from 5 to about 21 carbon atoms, glycerides, naphthenic acid and tall oil and (b) an approximately stoichiometrically equivalent quantity of a water-soluble silicate salt selected from the group consisting of sodium silicates, potassium silicates and ammonium silicates sufficient to neutralize all of the acid radicals of said nitrogen containing salt, said reaction being carried out in the presence of a solution containing colloidal silica and water-soluble silicate salt, said silica and water-soluble silicate salt being present in an amount such that said silica plus silica formed by converting said silicate salt by reaction with acid plus the combined silica from said water soluble silicate wihich is combined with said nitrogen containing compound comprises up to about 95% by weight of the total amount of said nitrogen containing compound, combined silicate and colloidal silica present in the final product, introducing an organic liquid which is at least substantially water-insoluble, said organic liquid being present in an amount of at least about 25% by weight based on the weight of said nitrogen containing compound, combined silica and colloidal silica and adding to the product obtained by reacting (a) and (b) a quantity of acid approximately stoichiometrically equivalent to the unreacted silicate salt present, the pH of the reaction system being adjusted to between about 6.5 to 9.5 thereby obtaining maximum adsorption of said organic liquid.

25. A process for preparing a siliceous amino compound which comprises reacting (a) a salt of a nitrogen containing compound selected from the group consisting of lower carboxylic acid salts of unsubstituted higher aliphatic mono amines, mineral acid salts of unsubstituted higher aliphatic mono amines, quaternary ammonium salts of unsubstituted higher aliphatic mono amines and partial amide salts, the partial amide salt being the reaction product of an alkylene polyamine and a material selected from the group consisting of aliphatic monocarboxylic acids, their esters and their acyl halides containing the radical RCO—, wherein R represents a carbon chain length of from 5 to about 21 carbon atoms, glycerides, naphthenic acid and tall oil and (b) a silicate salt selected from the group consisting of sodium silicates, potassium silicates and ammonium silicates, said reaction being carried out in the presence of a solution of colloidal silica, the quantity of said silicate salt being sufficient to neutralize all of the acid radicals of said nitrogen containing salt and to provide for an excess of silicate salt which when reacted with acid will form colloidal silica in addition to that which is already present, the resulting colloidal silica plus the combined silica which is combined with said nitrogen containing compound being present in an amount up to about 95% by weight of said nitrogen containing compound, combined silica and colloidal silica in the final product, introducing an organic liquid which is at least substantially water-insoluble present in an amount of at least about 25% by weight of said nitrogen containing compound, combined silica and colloidal silica, adding to the product obtained by reacting (a) and (b), a quantity of acid approximately stoichiometrically equivalent to the unreacted silicate salt present and maintaining the pH of the reaction system at between about 6.5 to 9.5 thereby obtaining maximum adsorption of said organic liquid.

26. A siliceous amino compound which comprises the reaction product of (a) a salt of a nitrogen containing compound selected from the group consisting of lower carboxylic acid salts of unsubstituted higher aliphatic mono amines, mineral acid salts of unsubstituted higher aliphatic mono amines, quaternary ammonium salts of unsubstituted higher aliphatic mono amines and partial amide salts, the partial amide of said partial amide salt being the reaction product of an alkylene polyamine and a material selected from the group consisting of aliphatic monocarboxylic acids, their esters and their acyl halides containing the radical RCO—, wherein R represents a carbon chain length of from 5 to 21 carbon atoms, glycerides, naphthenic acid and tall oil and (b) a water-soluble silicate salt selected from the group consisting of sodium silicates, potassium silicates and ammonium silicates said water-soluble silicate salt being present in an amount sufficient to neutralize all of the acid radicals of said nitrogen containing salt and having absorbed thereon from about 25% to about 200% by weight thereof of a non-volatile organic liquid which is at least substantially water insoluble.

27. A siliceous amino compound which comprises the reaction product of (a) a salt of a nitrogen containing compound selected from the group consisting of lower carboxylic acid salts of unsubstituted higher aliphatic mono amines, mineral acid salts of unsubstituted higher aliphatic mono amines, quaternary ammonium salts of unsubstituted higher aliphatic mono amines and partial amide salts, the partial amide of said partial amide salt being the reaction product of an alkylene polyamine and a material selected from the group consisting of aliphatic monocarboxylic acids, their esters and their acyl halides containing the radical RCO—, wherein R represents a carbon chain length of from 5 to 21 carbon atoms, glycerides, naphthenic acid and tall oil and (b) a water-soluble silicate salt selected from the group consisting of sodium silicates, potassium silicates and ammonium silicates said water-soluble silicate salt being present in an amount sufficient to neutralize all of the acid radicals of said nitrogen containing salt plus uncombined silica, said uncombined silica plus the silica which is combined with said nitrogen containing compound comprising up to about 95% by weight of the total amount of said nitrogen containing compound, combined silica and uncombined silica, having absorbed thereon a non-volatile organic liquid which is at least substantially water-insoluble present in an amount of from about 25% to about 200% by weight of said nitrogen containing compound, combined silica and uncombined silica.

References Cited in the file of this patent

UNITED STATES PATENTS

| | | |
|---|---|---|
| 2,629,691 | Peterson | Feb. 24, 1953 |
| 2,681,314 | Skinner et al. | June 15, 1954 |
| 2,748,081 | Peterson et al. | May 29, 1956 |
| 2,790,776 | Savage et al. | Apr. 30, 1957 |
| 2,820,006 | Matthews et al. | Jan. 14, 1958 |
| 2,967,828 | Ihde | Jan. 10, 1961 |